Patented June 12, 1945

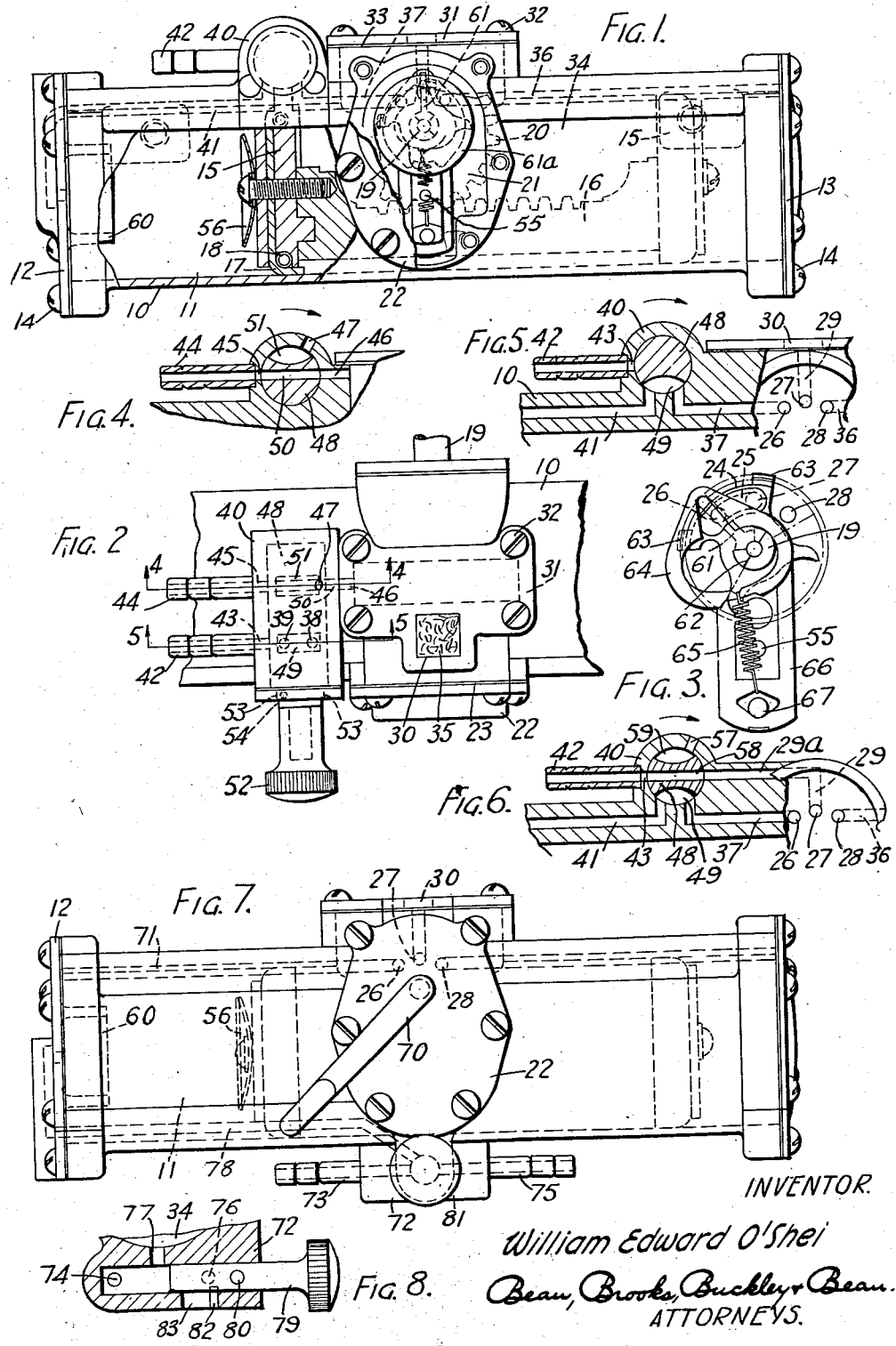

2,378,320

UNITED STATES PATENT OFFICE 2,378,320

FLUID PRESSURE MOTOR

William Edward O'Shei, London, England

Application April 28, 1943, Serial No. 484,819
In Great Britain April 28, 1942

11 Claims. (Cl. 121—164)

This invention relates to motors operated by compressed air or other fluid pressure, and more particularly, but not exclusively, to motors of this character which are intended for operating windscreen wipers on vehicles.

The invention is more especially concerned with parking arrangements for such motors whereby a motor may be parked in a predetermined position when not in operation. In the case of a windscreen wiper motor for example, the windscreen wiper blade may be moved to a parking position at an end of, or outside, the normal arc or field of movement of the blade. In compressed air motors such parking has hitherto been effected by moving the motor spindle manually to the parking position and locking it there, for example by means of a screw or clip. With parking arrangements of this character the compressed air supplied to the motor can be shut off. It is also known to park a compressed air motor by leaving the compressed air supply fed to the motor and providing means which prevent the automatic valve mechanism, with which the motor is usually provided, from actuating to reverse the movement of the motor piston means, whereby the latter is held in one extreme position by the compressed air applied to the motor. Parking arrangements of this latter character are, however, objectionable since any leakage in the motor results in loss of pressure in the compressed air reservoir from which the motor supply is drawn and which, on a vehicle, is generally also used to supply power for actuating the vehicle brakes. A further defect of such parking arrangements is that the compressed air constantly applied to the motor is likely to blow by the piston packing means and result in the lubricant in the motor drying out under the constant pressure influence and causing leakage around the piston means. For these and other reasons it is undesirable that the compressed air influence should be constantly applied to the motor during inoperative periods, which may be of long duration.

An object of this invention is to provide fluid pressure motors with improved parking means which will overcome or avoid the defects of prior arrangements. A further object is to provide motors of the character described which will operate efficiently on normal running and yet may be readily brought to rest in a predetermined position. Another object is the provision of automatic parking means functioning independently of the supply of compressed air or other pressure fluid employed as a source of power for normal operation of the motor. A further object is the provision of parking means which will function satisfactorily to hold the motor in parked condition without the assistance of the normal compressed air or other fluid supply. A further object is the provision of an improved motor having means whereby the piston means and piston chamber of the motor are relieved of any constant fluid pressure influence thereon when the motor is not in operation. These and other objects will more fully appear as the disclosure proceeds.

The invention contemplates, inter alia, a motor for operation by compressed air or other fluid, having means for parking the motor and/or holding the motor in parked position by suction.

The invention further contemplates the provision in a compressed air or other fluid motor of suction means for holding the motor in a predetermined parked position, which means automatically come into operation when the control means of the motor is moved to a motor stopping position, the supply of compressed fluid to the motor being cut off.

The invention also contemplates a motor adapted for operation by both fluid pressure and suction, and in which parking is effected by suction.

Illustratively, the invention will now be further explained with reference to the accompanying drawing, but it is to be understood that this disclosure is by way of example only and that the invention is not to be considered as limited otherwise than as defined in the appended claims.

In the drawing,

Fig. 1 is a side view of a compressed air motor incorporating an embodiment of the invention, with certain parts broken away and shown in section;

Fig. 2 is a fragmentary top plan view of the motor;

Fig. 3 is a phantom view, drawn on a larger scale, of automatic valve mechanism employed in the motor;

Fig. 4 is a fragmentary section taken on the line 4—4 of Fig. 2;

Fig. 5 is a fragmentary section taken on the line 5—5 of Fig. 2;

Fig. 6 is a fragmentary sectional view similar to Fig. 5, showing a modification;

Fig. 7 is a side view of a motor incorporating an alternative embodiment of the invention; and Fig. 8 is a fragmentary section taken on the line 8—8 of Fig. 7.

The motor illustrated in Figs. 1 and 2 is, in its main details, a compressed air motor of the character disclosed in my Patent No. 2,346,502 granted April 11, 1944. The motor comprises a tubular casing 10 which is conveniently made as a die-casting and which provides a cylindrical piston chamber 11. The ends of the chamber 11 are closed by cylinder heads 12 and 13 which are secured to the casing 10 by suitable fasteners such as screws 14. Within the chamber 11 are arranged a pair of pistons 15 which are interconnected by a rack element 16. Each piston comprises a cup leather or packing 17, the leathers on the two pistons being inwardly cupped, and a spring 18 may be provided for expanding each cup leather 17 against the wall of the chamber 11. The motor shaft 19 carrying the pinion 20 is supported by bearings which are formed integrally with the casing 10 and which extend inwardly so as to locate the pinion 20 in line with the rack 16 and in toothed engagement therewith. The pistons are adapted to be reciprocated in the cylinder 11 and, by the engagement between the rack 16 and pinion 20, angularly oscillate the shaft 19. As seen in Fig. 2, the shaft 19 extends at one end through the casing 10 for attachment thereto of a member such as a windscreen wiper arm to be driven thereby, the shaft passing out of the casing through a gland to prevent leakage of air at that place. The other end of the shaft enters a valve chamber 21 (Fig. 1) which is sealed in airtight manner by a cover 22 with the interposition of a gasket 23, as seen in Fig. 2. In valve chamber 21 is arranged an automatic valve mechanism by which the admission of differential fluid pressures to the piston chamber 11 is controlled for operating the motor. The valve mechanism is made automatic in action under control of the movement of the shaft 19 so that the valve mechanism is automatically reversed each time the shaft reaches the limit of its oscillation in either direction. As more clearly shown in Fig. 3, the automatic valve mechanism comprises an oscillatory valve 24 mounted for movement upon and about the axis of that end of the shaft 19 which lies in the valve chamber 21. The valve 24 has an arcuate channel 25 therein and is movable arcuately between two positions by means of a snap-action mechanism operated by the movement of the shaft 19, the valve 24 operating against a valve seating in the valve chamber, the seating having three valve ports 26, 27 and 28 disposed arcuately therein so as to cooperate with the channel 25 in the valve 24. The valve always covers the middle port 27 and is operated so as also to cover the ports 26 and 28 alternately in the two positions of the valve and thereby effect communication of the ports 26 and 28 alternately with the port 27 by way of the channel 25 in the valve. The ports 26 and 28 are each open to the valve chamber 21 when not covered by the valve.

Snap-action mechanism for operating the valve 24 comprises a kicker 61 which is weighted by means of a disc 61a and is pivoted to the shaft 19 at the axis of the latter and is engageable by faces 62 of a recess in the end of the shaft. The kicker is engageable with ears 63 on the valve 24 to shift the latter between its two operative positions, and the outer end of the kicker is engaged by a frame 64 which is anchored by a spring 65 to a pressure plate 66 which is mounted over the shaft 19 and a post 67 extending from the face of the casing 10 within the valve chamber 21, the pressure plate bearing against the outer face of the valve 24.

It will be seen that when the shaft 19 turns angularly clockwise, as viewed in Figs. 1 and 3, the left shoulder 62 will engage and move the kicker 61 until the outer end thereof passes beyond its dead-centre position (shown in Fig. 1) on the dead-centre line extending through the centre of post 67 and the centre of shaft 19, whereupon the spring 65 will snap the kicker clockwise against the right ear 63 of the valve 24 and move the latter to its right limit position. Movement of the shaft in the opposite direction, counter-clockwise, will cause the parts to operate in the reverse manner, snapping the valve to its left limit position seen in Fig. 3.

The port 27 leads by passage 29 to an exhaust aperture 30 in the cover plate 31 which is secured, as by screws 32, to the top of the motor casing 10 with the interposition of a gasket 33 in order to prevent leakage from the space 34 in the piston cylinder 11 between the two pistons 15. Within the aperture 30 is arranged a piece of felt or the like 35 to act as a silencer. The ports 26 and 28 lead into passages located outside the chamber 11 and preferably formed in ribs cast integrally with the casing 10. The port 28 leads into the passage 36 which communicates directly with the chamber 11 at the right end thereof as viewed in Fig. 1. The port 26 leads into a passage 37 (shown more clearly in Fig. 5) which can communicate through ports 38 and 39 (Fig. 2) in the body 40 of a control valve with a passage 41 which leads to the left end of the piston chamber 11 through a cup 60 on the cylinder head 12.

The control valve body 40 may be cast integrally with the motor casing, and is provided with a nipple 42 which leads to a port 43 in the body associated with port 39 therein. The valve body 40 is further provided with a nipple 44 (Fig. 4) leading to a port 45 in the body and opposite the port 45 the control valve body 40 has a passage 46 which effects direct communication between the control valve and the space 34 between the pair of pistons. The valve body 40 is also provided with a venting port 47 which is arranged for communication with the passage 46 as will be later explained.

The control valve body contains a rotary valve plug 48 which has a channel 49 (Figs. 2 and 5) formed therein as shown, cooperating with ports 38, 39 and 43 in the body 40. The plug 48 also has a passage 50 passing diametrically therethrough and a channel 51 formed therein as shown, the passage 50 and channel 51 being associated with the ports 45, 47 and passage 46 in the body 40. An extension of the plug 48 carries a knob 52 by which the control valve may be turned from one ("running") limit position to a second ("parking") limit position defined by suitable stops or abutments 53 on the valve body 40 between which a pin 54 carried by the valve plug 48 can move.

The valve chamber 21 communicates with the space 34 between the pistons by way of an aperture 55 in the wall portion of the casing 10 which partitions the valve chamber 21 from the piston chamber 11.

In operating the motor, the compressed air supply from any suitable source such as a compressed air reservoir is connected to the nipple 44, and the nipple 42 is connected to any suitable source of suction such as from the intake manifold of the internal combustion engine on a vehicle. With the control valve 40 in the position shown in Figs. 2, 4 and 5, the supply of compressed air through the nipple 44 is fed by way of the passages 50 and 46 directly into the space 34 between the pistons 15, and compressed air is fed to the valve chamber 21 from the space 34 through the aperture 55. In this position of the control valve 40, the channel 49 places the port 26 in communication, by way of passage 37, channel 49 and passage 41, with the cup 60 and left end of the piston chamber 11.

With the parts in the position shown in which the channel 25 in the valve 24 is effecting communication between ports 26 and 27, compressed air enters the right end of the piston chamber 11 from the valve chamber 21 by way of the uncovered port 28 and passage 36, while air will exhaust from the left end of the piston chamber 11 through cup 60 by way of passage 41, channel 49, passage 37, port 26, channel 25, port 27 and exhaust aperture 30. Accordingly, the pistons 15 will be moving to the left with resultant clockwise rotation of the shaft 19 until the latter causes the snap-action mechanism to reverse the valve 24, causing the compressed air to be applied to the left end of the piston chamber 11 through the now uncovered port 26, while air is exhausted from the right end of the chamber 11. Thus, the automatically operating valve 25 will put opposite ends of the piston chamber 11 alternately in communication with compressed air and atmospheric air, so as to reciprocate the pistons.

When the control valve 40 is turned clockwise as viewed in Figs. 1, 4 and 5 into the "parking" position where the pin 54 thereof engages the right abutment 53, the passage 50 in the valve plug 48 is turned out of register with port 45 and passage 46 (Fig. 4) and the plug shuts off the supply of compressed air through the nipple 44. At the same time, the channel 51 in the valve plug 48 places the passage 46 in communication with the vent 47, thus putting the space 34 between the pistons 15 and hence the valve chamber 21 into communication with atmospheric air. The valve plug 48 also closes port 38 and thus shuts off the passage 37 from passage 41, the channel 49 now effecting communication between the suction supply nipple 42 and the passage 41.

Therefore, when the control valve 40 is turned to the parking position, the supply of compressed air to the motor is interrupted, while suction is applied through the passage 41 and cup 60 to the left end of the piston chamber 11. The right end of the chamber 11 is in communication with atmospheric air regardless of the position that the valve 24 happens to be in when the control valve 40 is shifted to the parking position. For, if the valve 24 is in its left limit position covering ports 26 and 27, then the right end of piston chamber 11 is open to atmosphere by way of passage 36, port 28, valve chamber 21, aperture 55, space 34, passage 46, channel 51 and vent 47. If the valve 24 is in its right limit position covering ports 27 and 28, the right end of chamber 11 is open to atmosphere by way of passage 36, port 28, valve channel 25, port 27, passage 29 and exhaust aperture 30. Therefore, since suction is applied to the left end of the chamber 11 while the right end thereof is open to atmosphere, the pistons 15 will be caused to move to the left to a parked position where a closure 56 of leather or other flexible material carried by the left piston 15 seats over and closes the cup 60, thus relieving the chamber 11 of any constant suction influence thereon, the closure being held against the cup by the atmospheric air pressure on the right piston 15. This prevents the lubricant in the piston chamber 11 from drying out under the suction influence and causing leakage around the pistons. If, by vibration or for any other reason the piston should tend to creep away from the parked position, this would uncover the cup 60 whereupon suction would be reapplied to the left end of the piston chamber so as to restore the pistons to the parked position. The closure 56 also acts as a buffer or shock absorber safeguarding the mechanism against damage when the pistons are arrested in their leftward motion by the rim of the cup 60.

The motor described in the foregoing normally operates by compressed air, suction being used only for parking. However, as already disclosed in my Patents No. 2,345,213 granted March 28, 1944, and No. 2,346,502 issued April 11, 1944, the motor may be arranged for operation by both compressed air and suction, the application of suction taking the place of exhaust to atmosphere, as will be appreciated. The motor may be arranged for normal operation by both compressed air and suction, with parking by suction alone, by simple modification of the motor in the manner illustrated in Fig. 6. The modifications necessary comprise closing or dispensing with the exhaust aperture 30 previously described and providing the passage 29 leading from the port 27 with an extension 29a leading to the body 40 of the control valve, the latter being provided with a further vent port 57 and the valve plug 48 being provided with a further through passage 58 and a further channel 59, the passage 58 being arranged to place the port 43 in communication with passage 29a when the control valve is in its left limit ("running") position as shown, the vent 57 being closed by the plug 48. The channel 59 is arranged to put the vent 57 in communication with passage 29a when the control valve is in its right limit ("parking") position. With these modifications, the control valve being otherwise unchanged, when the control valve is in the running position as shown in Figs. 4 and 6, compressed air is supplied to the motor as previously described, while it will be seen that air is withdrawn from the motor by suction applied to the port 27.

When the control valve is turned to its parking position, the compressed air supply is shut off and the valve chamber 21 vented by being put into communication with the vent 47, while suction is applied directly to the cup 60, all as previously described, and the port 27 is placed in communication with the atmosphere by way of passages 29, 29a, channel 59 and vent 57. The right end of the piston chamber 11 is open to atmosphere regardless of the position of the reversing valve 24, since if the latter is in its left limit position covering ports 26 and 27, the right end of the piston chamber 11 is open to atmosphere by way of passage 36, port 28, valve chamber 21, aperture 55, space 34, passage 46 and vent 47. In the other limit position of the valve 24 covering ports 27 and 28, the right end of the piston chamber 11 is open to atmosphere by way of passage 36, port 28, valve channel 25, port 27, passages 29 and 29a, channel 59 and vent 57.

In the further modified structure shown in Figs. 7 and 8, the motor shaft is extended through the cover 22 of the valve chamber, passing through a gland to prevent leakage of air at that place, the projecting end of the shaft being fitted with a lever 70 whereby the shaft may be turned manually. A passage 71 leading from the port 26 directly to the left end of the piston chamber 11 replaces the passages 37 and 41 of the motor shown in Fig. 1, and a control valve 72 replaces the control valve 40. The control valve is provided with a nipple 73 for compressed air supply which communicates with a port 74 in the valve body. Another nipple 75, for connection to a suction source, communicates with a passage 76 in the valve body. A passage 77 in the valve body communicates with the space 34 between the two pistons of the motor and another passage 78 leads outside the piston chamber 11 to the left end of the chamber 11 through the cup 60 on the cylinder head 12. The slide valve member 79 of the control valve has a diametric through passage 80 therein for controlling communication between the passages 76 and 78.

When the valve is pulled out by means of the knob 81 into the "running" position shown in Fig. 8, communication is established between port 74 and passage 77 thus allowing compressed air to be fed to the motor for operating the same, while the valve member 79 shuts off the passage 76 connected to the suction source. When the control valve is pushed in to stop the motor, the valve member 79 closes passage 77 to shut off the supply of compressed air and establishes communication between passages 76 and 78 by way of the passage 80 in the valve member, thereby causing suction to be applied through the cup 60 to the left end of the piston chamber 11. A pin 82 secured to the valve member 79 and operating in a slot 83 in the control valve body defines the two operative limit positions of the valve.

Since the right end of the motor chamber 11 will either be in communication with atmospheric air or will be shut off, according to the position that the automatic reversing valve of the motor happens to be in when the control valve is operated, the motor pistons tend to move to the parking position under influence of the suction applied through the cup 60. However, as the left end of the piston chamber 11 will, in one position of the reversing valve, be in communication with atmospheric air through that valve and the exhaust aperture 30, the movement of the pistons to the parking position may be sluggish. By manipulation of the parking lever 70 the pistons may, therefore, be moved manually to the parking position where the closure 56 carried by the left piston will seat over and close the cup 60. Suction applied through the cup 60 holds the motor in parked position. Upon again pushing the control valve to the running position, suction is cut off from the motor and compressed air is fed to set the motor running.

Although specific embodiments in the invention have been described, it will be apparent to those skilled in the art that changes and modifications may be made without departing from the spirit of the invention. For instance, it will be clear that the invention may be incorporated in or applied to motors otherwise than of the character described herein or in my patents aforesaid, and that the term "reciprocate" as used herein and in the appended claims is intended to include any back and forth movement whether the motion is rectilinear or curvilinear. Further, those skilled in the art may, from the disclosure herein, readily devise other parking arrangements than those specifically described in the foregoing, whereby a pressure-type of fluid-operated motor may be held in parked position, or both parked and held in parked position, by suction.

I claim:

1. A motor for operation by compressed fluid, comprising a piston chamber and piston means therein movable back and forth, and automatic valve means adapted to apply compressed fluid alternately to the opposite sides of said piston means while simultaneously connecting to exhaust that side of the piston means which is not for the time being under the influence of the compressed fluid, so as to actuate the piston means, and control means operable selectively either to connect a source of compressed fluid to the automatic valve means for operating the motor, or to connect a source of suction to one side only of the piston means for holding such means in a parked position.

2. A motor for operation by compressed fluid, comprising a piston chamber and reciprocable piston means therein, and automatic valve means adapted to apply compressed fluid alternately to the opposite sides of said piston means while simultaneously connecting to exhaust that side of the piston means which is not for the time being under the influence of the compressed fluid, so as to reciprocate the piston means, means for connecting a source of compressed fluid to the automatic valve means for operating the motor, means for connecting a source of suction to one side only of the piston means for moving such means to a parking position and there stopping the motor, both of said connecting means including common manual control means operable to render each of said connecting means inoperative when the other is operative.

3. A motor for operation by compressed fluid comprising a piston chamber and piston means reciprocable therein, automatic valve means adapted to apply compressed fluid alternately to the opposite sides of the piston means while simultaneously connecting to the exhaust that side of the piston means which is not for the time being under the influence of the compressed fluid, for reciprocating said piston means, control means operable selectively either for connecting a source of compressed fluid to said automatic valve means for reciprocating the piston means or for connecting a source of suction to one side only of said piston means for holding the same in a parked position, and a manually operable member operatively connected with said piston means for moving the same to the parked position.

4. A fluid-operated motor having a piston chamber and piston means reciprocable therein, means for connecting said chamber to three sources of mutually differential fluid pressures, means for applying a selected two of said three pressures alternately to opposite sides of the piston means for reciprocating the same, means for applying another selected two of said three sources to opposite sides of the piston means for unidirectionally moving the same to a predetermined parking position, and manual control valve means for effecting such selections from said sources.

5. A fluid-operated motor comprising a piston chamber and piston means reciprocable therein, automatic valve means adapted to apply differential fluid pressures alternately to opposite sides of said piston means for reciprocating the same, means for connecting the motor to three sources of mutually differential fluid pressures, and control valve means operative selectively either for connecting the source of highest fluid pressure and one other of said sources to said automatic valve means for reciprocating said piston means or for connecting the source of lowest fluid pressure and the source of intermediate fluid pressure respectively to opposite sides of said piston means for unidirectionally moving said piston means to a predetermined parking position.

6. A motor for operation by compressed fluid, comprising a piston chamber, piston means reciprocable therein, automatic valve means adapted to apply compressed fluid alternately to the opposite sides of said piston means while simultaneously connecting to exhaust that side of the piston means which is not for the time being under the influence of the compressed fluid, for effecting reciprocation of said piston means to operate the motor, control valve means operative to control the connection of a source of compressed fluid to said automatic valve means, and means operable under control of said control means for connecting a source of suction to one side only of the piston means when said control means is operated to disconnect the source of compressed fluid from the automatic valve means.

7. A fluid-operated motor as defined in claim 6, and having a manually operable member operatively connected with said piston means for moving the same manually in the piston chamber.

8. A fluid-operated motor comprising a piston chamber and piston means reciprocable therein, automatic valve means adapted to apply differential fluid pressures alternately to opposite sides of said piston means for reciprocating said piston means, control means operable selectively either for connecting both a source of compressed fluid and a source of suction to said automatic valve means for reciprocating said piston means or for connecting said source of suction to one side only of the piston means and at the same time putting the other side of the piston means into communication with atmospheric air for moving the piston means unidirectionally to and holding said piston means at a predetermined parked position.

9. A fluid-operated motor having a piston chamber and piston means reciprocable therein, automatic valve means operable to apply differential fluid pressures alternately to opposite sides of said piston means for reciprocating said piston means, means for connecting said automatic valve means to a source of compressed air and to atmospheric air for reciprocating the piston means, means for connecting one side of said piston means to a source of suction and the other side of said piston means to atmospheric air, and manual control means selectively operable to render either of said connecting means operative.

10. In a motor for operation by compressed fluid and having a piston chamber and piston means reciprocable therein and automatic valve means operable to apply compressed fluid alternately to the opposite sides of the piston means while simultaneously exhausting that side of the piston means which is not for the time being under the compressed fluid influence, control means operable to control the connection of a source of compressed fluid with said automatic valve means, for operating and stopping the motor, a manually operable member operatively coupled with said piston means for moving the same manually to a predetermined parked position, and means operable under control of said control means for connecting a source of suction to one side only of said piston means for holding said piston means in parked position.

11. A windscreen wiper system comprising a fluid-operated motor, a source of compressed air, a source of suction, means for connecting the motor to the source of compressed air for operating the motor, means for connecting the motor to the source of suction for holding the motor stationary, and control means common to both means aforesaid and operable to control the application of compressed air and suction selectively to the motor.

WILLIAM EDWARD O'SHEI.